(12) United States Patent
Kobayashi et al.

(10) Patent No.: US 8,419,051 B2
(45) Date of Patent: Apr. 16, 2013

(54) AIR BAG DEVICE FOR REAR-END COLLISION

(75) Inventors: Yoshihiro Kobayashi, Tokyo (JP); Tadahiro Igawa, Tokyo (JP)

(73) Assignee: Takata Corporation, Tokyo (JP)

(*) Notice: Subject to any disclaimer, the term of this patent is extended or adjusted under 35 U.S.C. 154(b) by 0 days.

(21) Appl. No.: 13/574,509

(22) PCT Filed: Dec. 10, 2010

(86) PCT No.: PCT/JP2010/072273
§ 371 (c)(1),
(2), (4) Date: Jul. 20, 2012

(87) PCT Pub. No.: WO2011/089796
PCT Pub. Date: Jul. 28, 2011

(65) Prior Publication Data
US 2012/0292894 A1 Nov. 22, 2012

(30) Foreign Application Priority Data
Jan. 22, 2010 (JP) .................................. 2010-012038

(51) Int. Cl.
*B60R 21/26* (2011.01)

(52) U.S. Cl.
USPC ................... 280/730.1; 280/730.2; 280/743.1

(58) Field of Classification Search ............... 280/730.1, 280/730.2, 743.1, 743.2
See application file for complete search history.

(56) References Cited

U.S. PATENT DOCUMENTS

| 7,364,185 B2 * | 4/2008 | Mori et al. ................. 280/730.1 |
| 7,621,558 B2 * | 11/2009 | Mori et al. ................. 280/730.1 |
| 7,909,357 B2 * | 3/2011 | Iida et al. .................... 280/730.1 |
| 2006/0055153 A1 * | 3/2006 | Hirata ......................... 280/728.1 |
| 2006/0214401 A1 * | 9/2006 | Hirata ......................... 280/730.1 |
| 2008/0143084 A1 * | 6/2008 | Mizuno et al. ............. 280/730.1 |
| 2009/0085330 A1 * | 4/2009 | Ilda et al. ................... 280/728.2 |

FOREIGN PATENT DOCUMENTS

| JP | H07-506789 A | 7/1995 |
| JP | 3195911 B2 | 6/2001 |
| JP | 2004-058849 A | 2/2004 |

(Continued)

OTHER PUBLICATIONS

International Search Report from the International Bureau of WIPO for International Application No. PCT/JP2010/072273 dated Feb. 22, 2011 (1 page) and an English translation of the same (1 page).

*Primary Examiner* — Toan To
(74) *Attorney, Agent, or Firm* — Fitch Even Tabin & Flannery, LLP

(57) ABSTRACT

Both ends of a sack-like body are fixed to fastening sections provided in a pillar-like frame in the rearmost part of a vehicle, and the sack-like body is housed along an air bag housing space in a portion of a roof. The sack-like body is composed of a fabric-made article that shrinks longitudinally when extended widthwise. At the time of a rear-end collision, the air bag is inflated by gas supplied from an inflator, and turns into an inflated body, starting from a housed state in the air bag housing space, in such a way that both ends of the air bag are supported by the fastening sections, the inflated shape of the inflated body being restricted by the sack-like body. This inflated body constrains the head sections of vehicle cabin occupants who move rearward due to the rear-end collision.

4 Claims, 17 Drawing Sheets

FOREIGN PATENT DOCUMENTS

| | | |
|---|---|---|
| JP | 2004-058850 A | 2/2004 |
| JP | 2006-088714 A | 4/2006 |
| JP | 2008-030595 A | 2/2008 |
| JP | 2008-037242 A | 2/2008 |

* cited by examiner

AIR BAG DEVICE FOR REAR-END COLLISION

CROSS-REFERENCE TO RELATED APPLICATIONS

This application is a U.S. national phase application filed under 35 U.S.C. §371 of International Application PCT/JP2010/072273, filed on Dec. 10, 2010, designating the United States, which claims priority from Japanese Application 2010-012038, filed Jan. 22, 2010, which are hereby incorporated herein by reference in their entirety.

FIELD OF THE INVENTION

The present invention relates to an air bag device for rear-end collision, and more particularly to an air bag device for rear-end collision that prevents secondary collision in the rear-end section of a vehicle due to a passenger sitting in the rearmost seat moving rearward when the vehicle is in a rear-end collision.

BACKGROUND OF THE INVENTION

Air bag devices that are equipped in a vehicle are placed at various locations inside the vehicle in order to adequately restrain a passenger according to various kinds of collisions.

For example, when a vehicle is in a rear-end collision accident, an air bag device for rear-end collision has been proposed that would protect a passenger from impact that is applied from the rear of the vehicle.

In ultra compact cars that have been developed in recent years, or in various kinds of minivan-type one-box cars, in order to maintain sufficient space inside the vehicle, the rearmost seat may be placed such that the seat back is located directly in front of the back door. In an ultra compact car, the rearmost seat may, for example, be a front seat that has been moved toward the rear. In a minivan having a layout with three rows of seats, the rearmost seat may be the third row of seats.

In a vehicle where the rearmost seat back is close to the back door in this way, when the vehicle is hit from behind by a moving vehicle at a speed of about 50 km/h, a passenger sitting in the rear seat moves toward the back of the seat (in the direction of the colliding vehicle), and may hit the back of his/her head on the rear window or the like in the rear-end section of the vehicle. In order to prevent such an accident, the use of an air bag device for rear-end collision is effective.

A conventional air bag device for rear-end collision is such that an air bag is housed in a folded state in an air bag housing space, which is a space between the rear-end section of the vehicle roof, for example the rear end of the roof panel, and the interior rear roof ceiling panel.

When a collision from the rear of the vehicle is detected, an inflator that is connected to the air bag operates and injects gas into the air bag. The injected air causes the air bag to inflate and expand in a curtain shape downward from the housing space in the roof toward the bottom of the vehicle cabin, covering the rear window. As a result, the air bag prevents a secondary collision with the rear window by the passenger that moves toward the rear.

SUMMARY OF THE INVENTION

Unexamined Japanese Patent Application Kokai Publication No. 2008-30595 discloses an air bag device for rear-end collision that covers the rear window like curtain, with the top edge of the air bag being fastened to the roof at three points. The inflated and expanded air bag is supported by the top edge in a single side fixed state.

Therefore, when gas flow into the air bag, there is a problem in that unevenness occurs in the expansion of the air bag due to the force of that gas, and it may take time for the entire air bag to become completely inflated and expanded. There is also a possibility that when the rear window is tilted at a sharp angle, it is impossible to stably expand the air bag along the window surface.

In Unexamined Japanese Patent Application Kokai Publication No. 2004-58849, in order to solve the problems above, tension applying units are provided on both the left and right end sections of an air bag that inflates and expands over the rear window glass. By fastening the bottom end sections of the tension applying units to fastening members such as the rear-end pillars of the vehicle and/or the like, the inflated air bag is inflated and expanded by a specified tension at a mid-height position of the rear-end pillars of the vehicle.

However, in this case as well, in the inflation stage, tension in the horizontal direction is applied to the air bag, so there is a possibility that smooth downward expansion of the air bag will be hindered.

Therefore, in order to solve the problems with the conventional technology described above, the object of the present invention is to provide an air bag device for rear-end collision that, during a rear-end collision, is capable of smooth inflation and expansion at a proper position of the rear-end section of the vehicle, and is capable of keeping a passenger that moves toward the rear safe.

In order to accomplish the objective above, the air bag device for rear-end collision of the present invention comprises: a rear-end collision detector that detects a rear-end collision of a vehicle; an inflator that in response to detection of a collision by the rear-end collision detector, supplies gas to an air bag; an air bag that is connected to the inflator, and inflates by gas that is supplied from the inflator; a sack-like body that houses the air bag and that extends widthwise and shrinks longitudinally; fastening sections that are provided on side frame of the vehicle, and that fasten the end sections in the longitudinal direction of the sack-like body; and a housing section that is provided at a top section or a bottom section of the vehicle along the side frame, and houses the sack-like body that is fastened to the fastening sections; wherein the sack-like body that is housed in the housing section extends widthwise and shrinks longitudinally as the air bag inflates and expands, and maintains a tensed state and is positioned between the fastening sections.

The side frame may be a pillar-like frame at the rearmost part of the vehicle.

The side frame may be a door frame at the rearmost part of the vehicle.

The length in the width direction of the sack-like body may extend, and the length in the longitudinal direction may shrink as the air bag inflates, such that the inflated sack-like body is regulated to a specified and inflated shape so as to be positioned along a straight line connecting between the fastening sections.

As described above, the present invention has the effect of being able to be compactly housed inside the roof or backdoor during normal operation, and being able to inflate and expand to a specified shape at a suitable position during a rear-end collision, enabling to protect the back of the head of a passenger moving toward the rear.

DETAILED DESCRIPTION OF THE PREFERRED EMBODIMENTS

In the following, embodiments of the air bag device for rear-end collision of the present invention will be explained with reference to the accompanying drawings.

Figure 1:
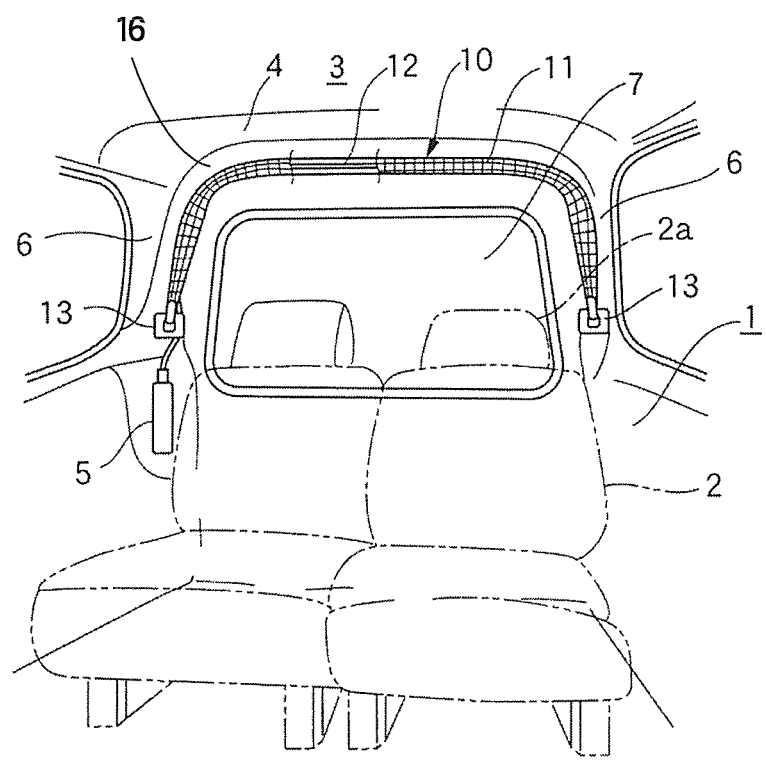
FIG. 1 is a drawing illustrating the inside of a vehicle when the air bag device for rear-end collision of the present invention is housed inside the roof.

FIG. 1 is a drawing illustrating the state wherein the air bag device 10 for rear-end collision of the present invention (hereafter, simply referred to as air bag device 10) is folded and housed inside the roof 3 above the rearmost seat 2 inside a vehicle cabin 1, and illustrates the seat as seen from the front of the vehicle cabin 1 with part of the interior roof panel 4 removed.

Figure 2:
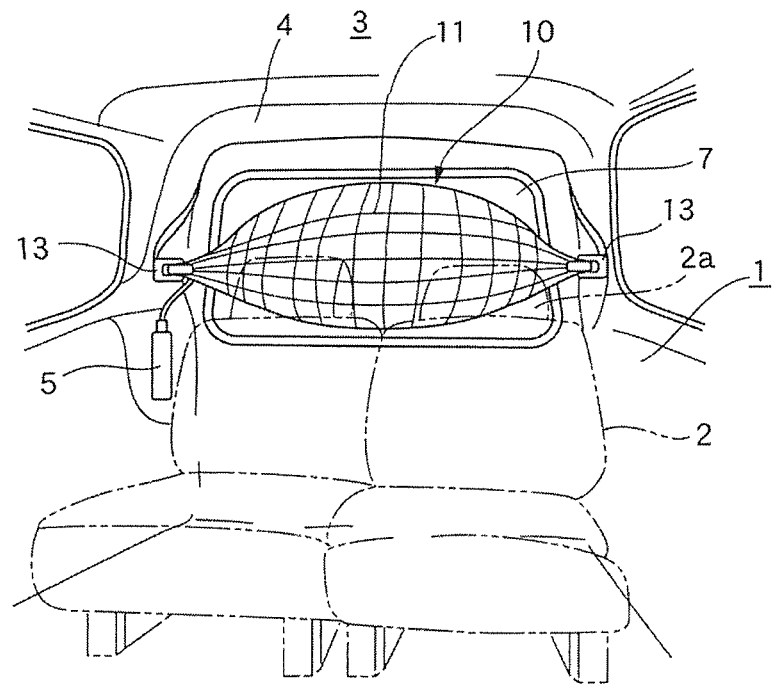
FIG. 2 is a drawing illustrating the inside of a vehicle when the air bag device for rear-end collision of the present invention is inflated and expanded at the rearmost position of the vehicle.

FIG. 2 is a drawing illustrating the seat wherein the air bag device 10 illustrated in FIG. 1 is inflated and expanded to a specified shape. As illustrated in both drawings, the air bag device 10 comprises an inflator 5 and an air bag 12 that is housed inside a sack-like body 11. The sack-like body 11 is a fabric that is woven into a mesh (net). This fabric has a woven configuration such that the fabric flexibly extends in the width direction (circumferential direction) by undergoing a heating and stretching process, however, hardly extends at all in the longitudinal direction.

Both ends of the sack-like body 11 are fastened to fastening sections 13 that are provided on the rearmost pillars 6 of the vehicle (hereafter, called pillars 6). Gas that is supplied from an inflator 5 that operates during a collision causes the sack-like body 11 that is supported on both ends by the fastening sections 13 to inflate and expand on the inner side of the rear window 7.

In this specification, the "backdoor" refers to a spatial area in the rear-end section of a vehicle that has a door at the rear end such as minivan type of vehicle as described above.

In the following embodiment, an example of an air bag 12 that is equipped inside the roof 3 of this backdoor, or inside the rearmost door 15 of the vehicle is explained.

The inflator 5, as illustrated in FIG. 1, is supported by the frame on the side surface (not illustrated in the figure) of the rear-end section of the vehicle, and by operating according to an operation instruction from a controller 8 (FIG. 3A) when a rear-end collision is detected, supplies generated gas to the air bag 12. The air bag 12 is folded into a thin strip like shape having a specified width, and housed inside the sack-like body 11.

Figure 3A:
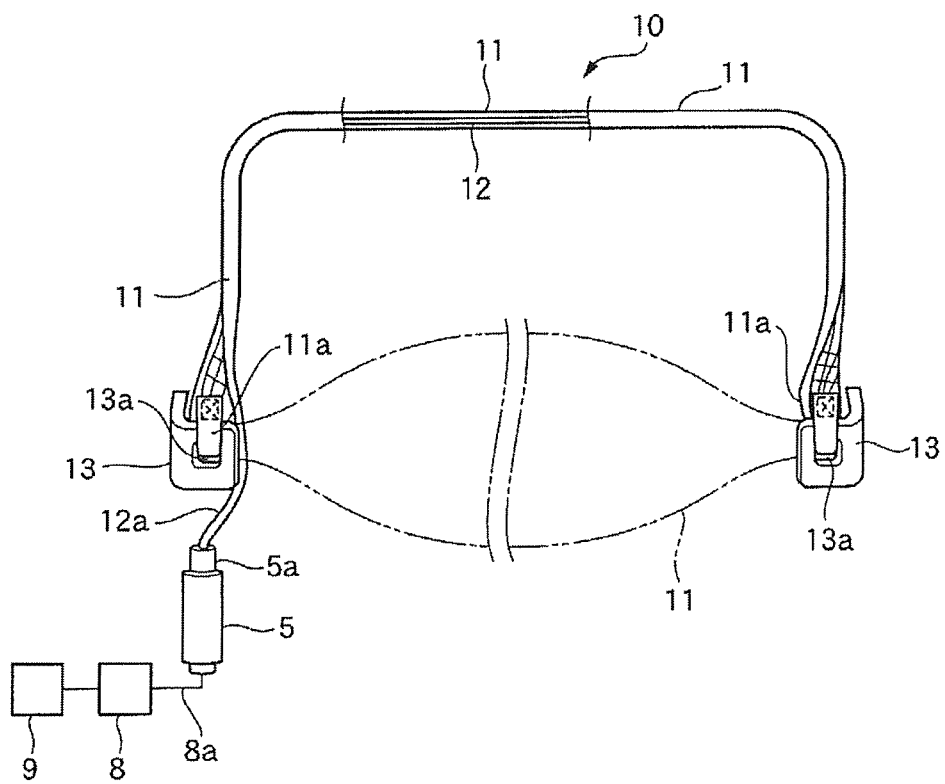
FIG. 3A is a drawing illustrating only the air bag device for rear-end collision in FIG. 1, and illustrates the state wherein that air bag device is housed.

Both ends of the flat sack-like body 11 in which the air bag 12 is housed are fastened to mounting brackets 13, which are the fastening sections, that are provided on the pillar 6 frame (not illustrated in the figure). Both ends of this sack-like body 11 are fastened toward the mounting brackets 13, and as illustrated in FIG. 1 and FIG. 3A, are guided along the pillars 6 to the roof position. Then, on the interior roof panel 4, this sack-like body 11 is housed in an air bag housing space 16 such that when seen from the front of the vehicle cabin, the overall shape appears as a flat, inverted U-shape (refer to FIG. 6 for details of the stored position of the sack-like body 11 (air bag 12)).

In this state, when a rear-end collision detection sensor 9 (see FIG. 3A) detects a certain degree of collision or greater, the air bag 12 of the air bag device 10 inflates and expands as illustrated in FIG. 2 from the state of being housed inside the housing space 16 in the roof 3 to a long, thin spindle-like shape wherein both ends are supported by fastening sections (mounting brackets 13) that are provided on the pillar 6 frame. As can be seen from FIG. 2, the air bag device 10 in the completely inflated and expanded state is horizontal at the same height as the fastening sections 13 on both ends and covers the rear window 7 from inside the vehicle. As a result, it is possible to ensure to receive and stop the back of the head of the passengers who move toward the headrests 2a of the rearmost seats indicated by the imaginary lines.

Figure 3B:
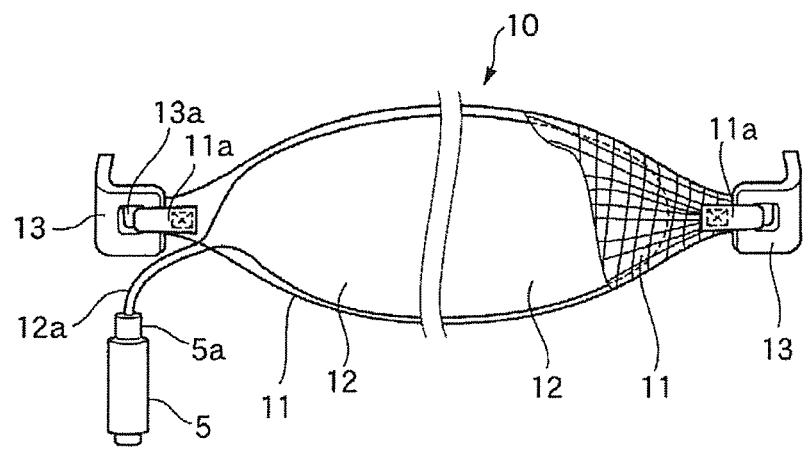
FIG. 3B is a drawing illustrating only the air bag device for rear-end collision in FIG. 2, and illustrates the state wherein that air bag device is inflated and expanded.

FIG. 3A is a drawing illustrating the construction of the air bag device 10 illustrated in FIG. 1 when removed from the vehicle. FIG. 3B is a drawing illustrating the construction of the air bag device 10 illustrated in FIG. 2 in the inflated and expanded state when removed from the vehicle.

As illustrated in FIG. 3A, both ends of the sack-like body 11 of the air bag device 10 are sewn together and fastened to fastening holes 13a of the mounting brackets 13. Sewn sections 11a, where normal fabric-end reinforcement material or the like having higher strength than the sack-like body 11 is sewn and attached, are formed on both end sections of the sack-like body 11. On the other hand, the mounting brackets 13 to which the sewn sections 11a are fastened are L-shaped processed parts made of formed steel, with a fastening hole 13a being formed in one flange, and a bolt hole (not illustrated in the figure) being formed in the other flange.

The mounting brackets 13 are bolted and fastened at specified positions on the pillar frame (not illustrated in the figure) by way of this flange. Moreover, as illustrated in FIG. 3A and FIG. 3B, sewing and attaching the sack-like body 11 is adjusted between the fastening holes 13a and the sewn sections 11a such that when the air bag 12 is inflated, the direction of the sack-like body 11 can easily change.

Figure 7:
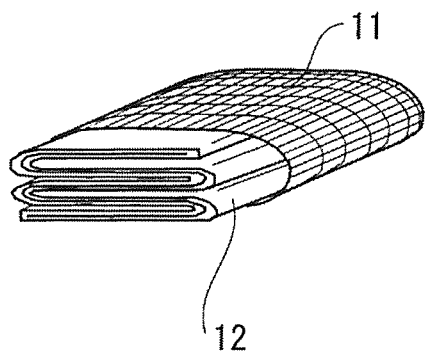
FIG. 7 is a partial perspective drawing illustrating the cross-sectional shape when the air bag is folded and housed in a sack-like body.

As illustrated in FIG. 3A and FIG. 7, the air bag 12 is housed inside the sack-like body 11 in a folded state. A gas supply tube 12a that is provided on the end section of the air bag 12 protrudes from an opening section (not illustrated in the figures) of the sack-like body 11 and is connected to a gas injection hole 5a of the inflator 5. A signal line 8a from the controller 8 is connected to the inflator 5.

When the rear-end collision detection sensor 9 detects a rear-end collision, the inflator 5 receives an ignition signal that is sent by way of this controller 8 and causes gas to be generated. The generated gas is supplied to the inside of the air bag 12 through the gas supply tube 12a. As a result, the air bag 12 inside the sack-like body 11 inflates in a long, thin spindle-like shape so that the sack-like body is spread open in the circumferential direction (width direction).

FIG. 3B illustrates the state when the air bag device 10 is inflated. As illustrated in FIG. 3B, when inflated, the air bag 12 is such that the cross-sectional shape of the center section in the longitudinal direction of the sack-like body 11 is nearly circular having a specified diameter. The sack-like body 11 that houses this air bag 12 is a fabric that is woven into a mesh-like (net like) weave, and by undergoing a heating and stretching process, flexibly extends in the width direction (circumferential direction), however, hardly extends at all in the longitudinal direction of the air bag 12.

Therefore, when the air bag 12 is inflated, the sack-like body 11 hardly expands in that longitudinal direction (tensile direction). Therefore, as the air bag 12 inflates in the circumferential direction, the sack-like body 11 stretches in the circumferential direction, however, the overall length in the longitudinal direction is shrunk.

As a result, as illustrated in FIG. 3A, the entire length of the sack-like body 11 that had an inverted U-shape when housed, is contracted to a length that forms a straight line between the mounting brackets 13 when the air bag 12 is inflated (FIG. 3B). In this state, there is sufficient tension applied to the sack-like body 11 in the longitudinal direction, so as illustrated in the figure, the air bag device 10 can be inflated and held nearly horizontally between the mounting brackets 13.

Figure 4:
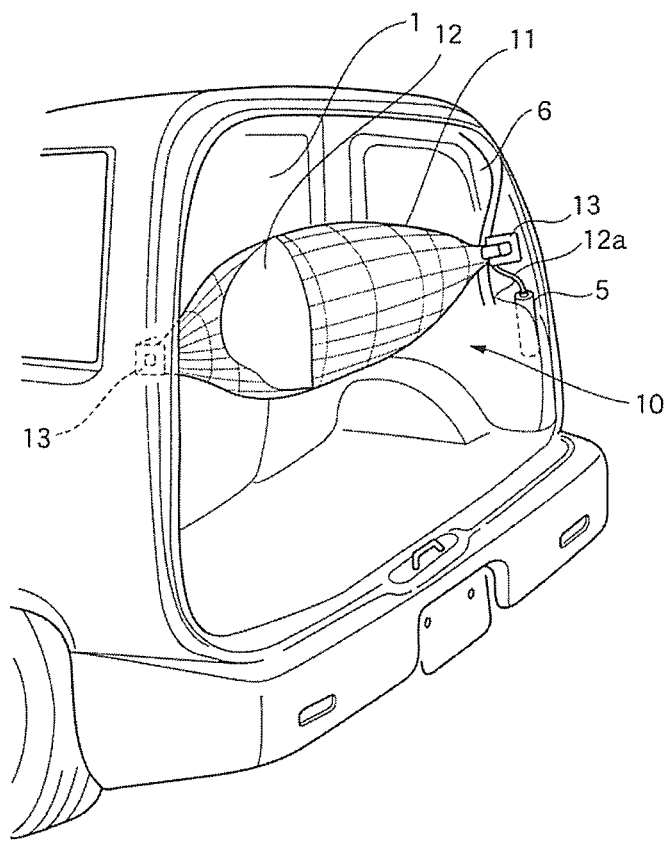
FIG. 4 is a perspective drawing illustrating the state wherein the air bag device for rear-end collision is housed inside the roof on the rear-end side of the vehicle and is inflated and expanded in a state such that both side are supported by pillars.
Figure 5:
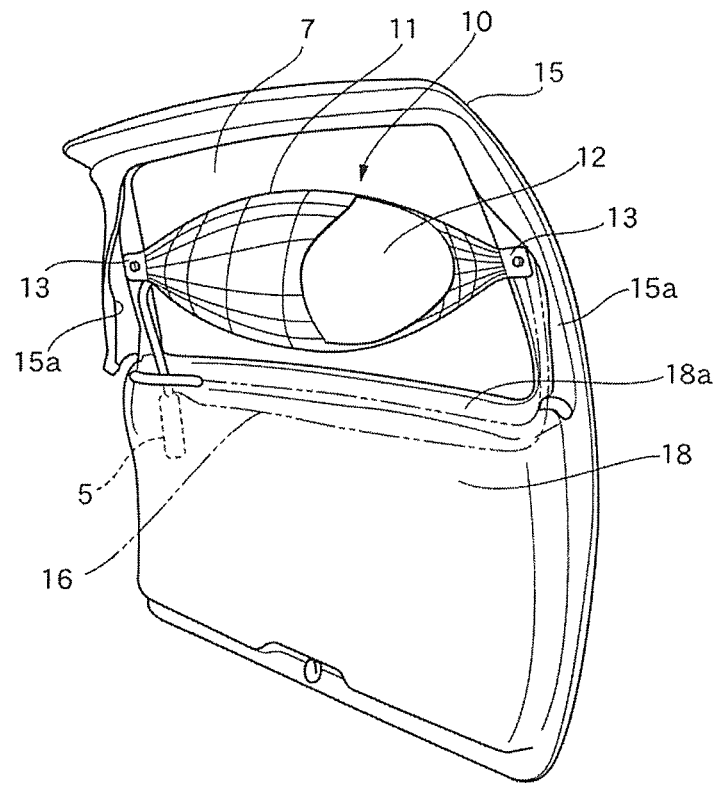
FIG. 5 is a perspective drawing illustrating the state wherein the air bag device for rear-end collision is equipped in the rearmost door of a vehicle (hatchback door) and is inflated and expanded in a state such that both ends are supported by the frame on the window side.

FIG. 4 and FIG. 5 are perspective drawings that schematically illustrate the inflated state of the air bag 12 in a minivan type of vehicle that is equipped with the air bag device 10 (hereafter, unless distinguishing between the sack-like body 11 and the air bag 12 inside in explanation, the sack-like body 11 and the air bag 12 housed therein will be handled as one, and referred to as the "air bag 12").

FIG. 4 is a drawing of an air bag device 10 that is equipped inside an air bag housing space (not illustrated in the figure) in part of the roof at the rearmost part of a minivan vehicle, and illustrates the state wherein the air bag 12 is inflated. As illustrated in FIG. 4, the sack-like body 11 that covers the air bag 12 is inflated into a long, thin spindle-like shape over the entire width of the backdoor opening. Here, part of the inner plate of the pillars 6 in which the sack-like body 11 was housed transforms and bends so that sack-like body 11 is open and completely exposed to the inside of the vehicle cabin. One of the mounting brackets 13 that is fastened to the pillar 6 frame (mounting bracket on the side where the inflator 5 is located) is indicated by a solid line, and the other is indicated by a dashed line.

FIG. 5 is a perspective drawing illustrating the rearmost door 15 of a minivan vehicle when removed from the vehicle. As illustrated in FIG. 5, the air bag device 10 is housed inside an air bag housing space 16 (indicated by the 2-dot chain line) that is provided inside the interior panel 18 of the bottom section of the rear window 7 of the rearmost vehicle door 15. Part of the upper surface 18a of the interior panel 18 that is located on the bottom end of the rear window 7 is open. Preferably, the air bag 12 is inflated and expanded as illustrated in the figure from a folded state.

In FIG. 5, part of the folded air bag 12 is housed inside the housing space 16 at the bottom section of the rear window 7. Preferably, a thin section 15a that can deform along the vertical direction is formed in part of the frame panel near the housed portion. In doing so, as illustrated in FIG. 5, the sack-like body 11 that houses the air bag 12 inflates and expands so that it protrudes upward from the bottom end of the rear window 7, and finally can smoothly expand to the shape illustrated in the figure.

Figure 6:
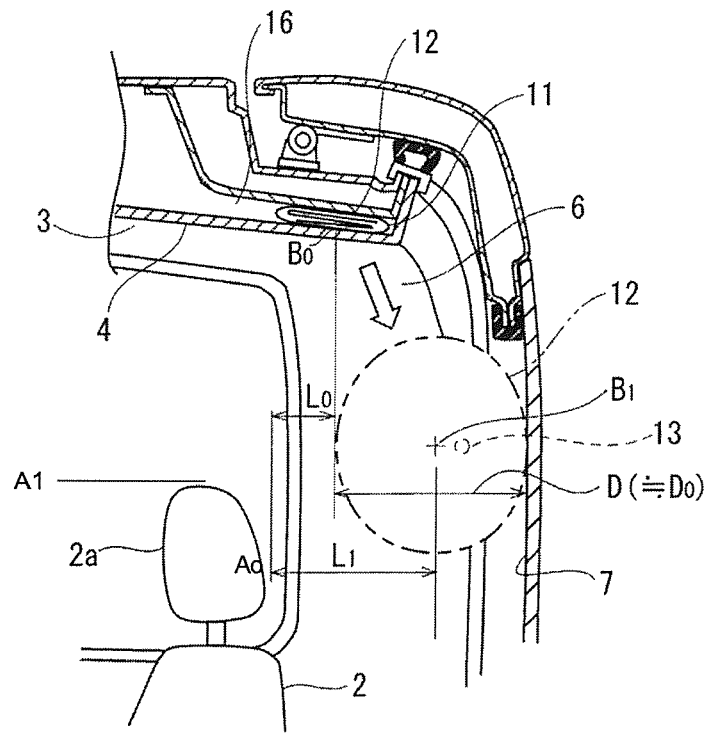
FIG. 6 is a partial cross-sectional view illustrating the state wherein the air bag device for rear-end collision is housed inside the roof, and the positional relationship with the headrest when the air bag is inflated.

The housed state and inflated state of the air bag 12 of the air bag device 10, and the positional relationship with the vehicle seat will be explained with reference to FIG. 6. In FIG. 6, an example is illustrated wherein the air bag 12 is housed inside an air bag housing space 16 that is provided in the roof 3. As illustrated in FIG. 6, the air bag 12 that is folded in a thin, strip-like shape and housed inside the sack-like body 11 (see FIG. 7) is housed inside the air bag housing space 16 that is provided in the interior panel 4 of the rearmost part of the ceiling of the vehicle cabin 1 in a state along the curve formed by the interior panel 4.

Preferably, that housed position is such that the cross-sectional center $B_0$ of the air bag 12 that is folded in a thin, strip-like shape is located to the rear of headrest 2a's rear end $A_0$. The distance $L_0$ between the rear end $A_0$ and the cross-sectional center $B_0$ is set according to the distance between the rearmost seat of the vehicle and the rear end of the vehicle (inner surface of the rear window 7).

Preferably, in order that the air bag 12 completely inflates in the space behind the passenger and keeps the passenger from moving backward, the distance $L_1$ between the rear end $A_0$ of the headrest and the center $B1$ of the inflated air bag 12 is ensured to be ½ the thickness D of the inflated air bag 12 or greater (a value nearly equal to the diameter $D_0$ when inflated). The diameter $D_0$ of the inflated air bag 12 can be appropriately set as described above according to the dimension of the space of the vehicle.

When the air bag 12 is freely inflated it has a nearly circular cross-sectional shape, however, when the air bag 12 is inflated as illustrated in FIG. 6 and part of the air bag 12 comes in contact with the inner surface side of the rear window 7, the cross-sectional shape of the air bag 12 instead of being circular may have a somewhat elongated circular shape. Therefore, the thickness D of the air bag 12 is set taking that case into consideration.

In FIG. 6, the position of the cross-sectional center $B_1$ of the inflated air bag 12 and the position of the fastening position of both ends of the air bag 12 (in FIG. 6, the position of the mounting brackets 13 is indicated by a dashed circle mark) are offset a little in the forward-backward direction, however, are at nearly the same height. Therefore, in order to achieve the effect of completely restraining the passenger by the inflated air bag 12, the position of the mounting brackets 13 of the air bag 12 is located higher than the top end A1 of the headrest 2a.

The construction of the folded air bag 12 and the sack-like bag 11 that houses the air bag 12 will be explained with reference to FIG. 7 to FIG. 9C.

Figure 9A:
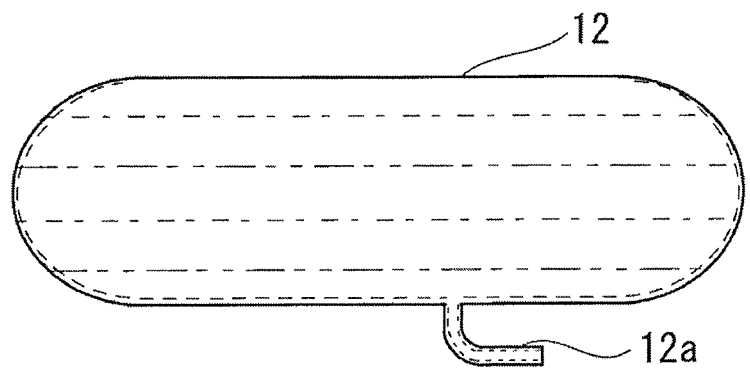
FIG. 9A is a top view illustrating the state of the air bag before being folded.
Figure 9B:
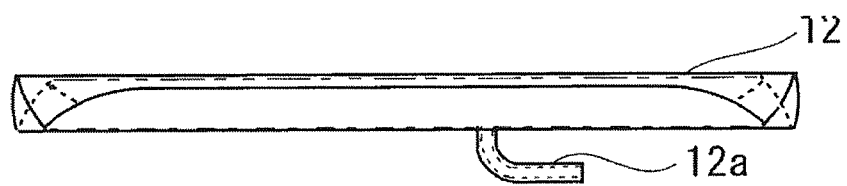
FIG. 9B is a top view illustrating the state of the air bag after being folded.
Figure 9C:
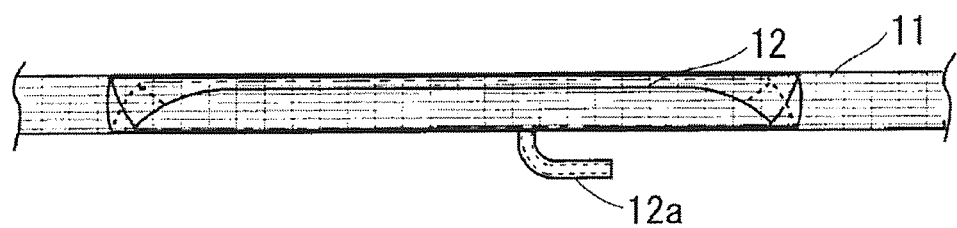
FIG. 9C is a top view illustrating the state wherein the folded air bag is housed in a sack-like body.

FIG. 7 is a perspective drawing schematically illustrating the housed state of the folded air bag 12 inside the sack-like bag 11 (see FIG. 9C). As illustrated in FIG. 7, the air bag 12 is folded into a strip like shape having a specified width in order that it can be housed inside the thin, strip-shaped sack-like body 11. The air bag 12 that is housed inside this thin, strip-shaped sack-like body 11 (see FIG. 7) is housed inside a specified air bag housing space 16 as illustrated in FIG. 6.

Figure 8A:
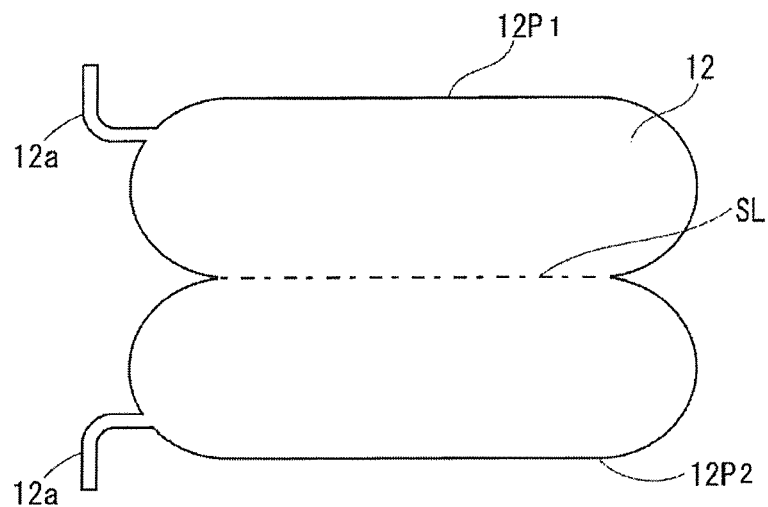
FIG. 8A is a top view illustrating the air bag panel before being sewn.
Figure 8B:
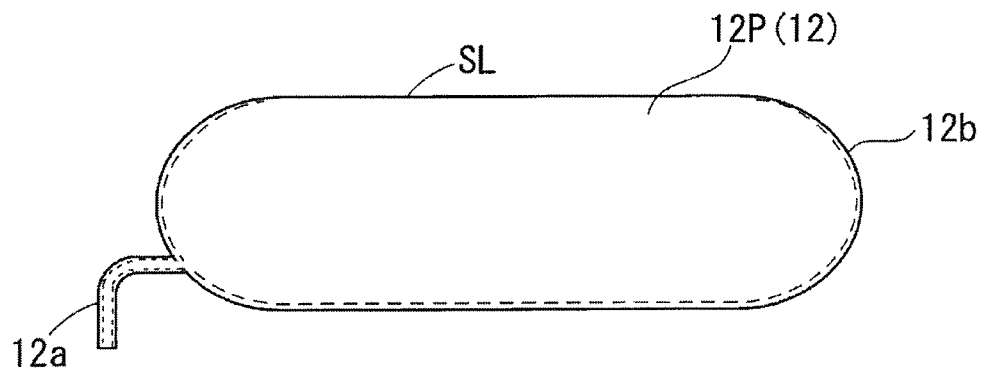
FIG. 8B is a top view illustrating the air bag panel after being sewn.

FIG. 8A and FIG. 8B are top views illustrating the panel before and after being sewn together, FIG. 9A is a top view illustrating the state of the air bag 12 before being folded, FIG. 9B is s top view illustrating the folded state of the air bag 12, and FIG. 9C is a top view illustrating the state of the folded air bag 12 housed inside the sack-like body 11.

In this specification, the base fabric that is cut into a specified shape in order to form the air bag 12 is called a "panel". A material such as a woven fabric made of polyamide thread that has been coated with a thin resin coating is used, for example, as the material for this base fabric. As illustrated in FIG. 8B, sealing is performed for the sewn seam between panels that have been folded in two, and sewing is performed along that sealed location (not illustrated in the figure). As a result, gas is prevented from leaking from the seam location 12b and seam line when inflated.

FIG. 8A is a top view of the panel 12P that was cut into a symmetrical shape about a symmetry line SL so that the panel 12 can be folded in two along that symmetry line SL. The panel 12P comprises two parallel straight sections, and two oval shaped sections 12P1, 12P2 that connect with the ends of the straight sections in a semicircle. The oval shaped sections 12P1 and 12P2 are cut so that a nearly L-shaped gas supply tube 12a is integrally formed at positions opposite each other along the symmetry line SL.

FIG. 8B is a top view of the panel 12P of the completed air bag 12, where the panel 12P illustrated in FIG. 8A is folded in two along the symmetry line SL and sewn around the outer perimeter edge. During a collision, this air bag 12 is inflated by gas that is supplied from the gas supply tube 12a. This air bag 12 when completely inflated is such that the cross-sectional shape of the center portion is near circular. Therefore, the diameter of the air bag 12 when inflated can be accurately set according to the dimensions when cutting out the panel shape.

In the following, an example of the procedure for folding the air bag 12 and the housed state inside the sack-like body 11 will be explained with reference to FIG. 9A to FIG. 9C.

FIG. 9A illustrates the air bag 12 that is formed with the gas inlet tube being formed in the bottom section. When this air bag 12 is equipped in the rearmost door 15 of a vehicle as illustrated in FIG. 5 and FIG. 11, the air bag 12 is shaped so the inflator 5 can be stored easily in a safe location. In FIG. 9A, fold lines (2-dot chain lines indicate valley fold lines, 1-dot chain lines indicate peak fold lines) where the air bag 12 is folded are illustrated for the purpose of explanation. The air bag 12 can be folded along these fold lines into a bellows shape as illustrated in FIG. 7 and FIG. 9B. The air bag 12 that is folded into this bellows shape is housed inside the sack-like body 11 having a specified length (see FIG. 9C), and both ends of this sack-like body 11 are attached to specified locations of the vehicles by way of the mounting brackets 13 on the pillars 6 (see FIG. 1, FIG. 3A).

Figure 10A:
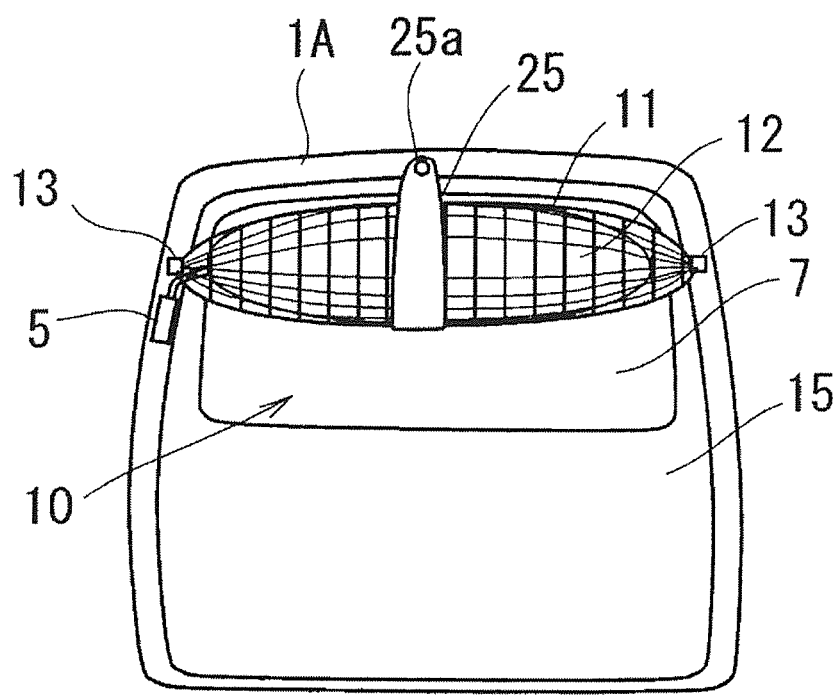
FIG. 10A illustrates an air bag device for rear-end collision that is equipped inside the roof at the rear end of a vehicle, and is a partial front view of an example of supporting the inflated air bag at a specified position.
Figure 10B:
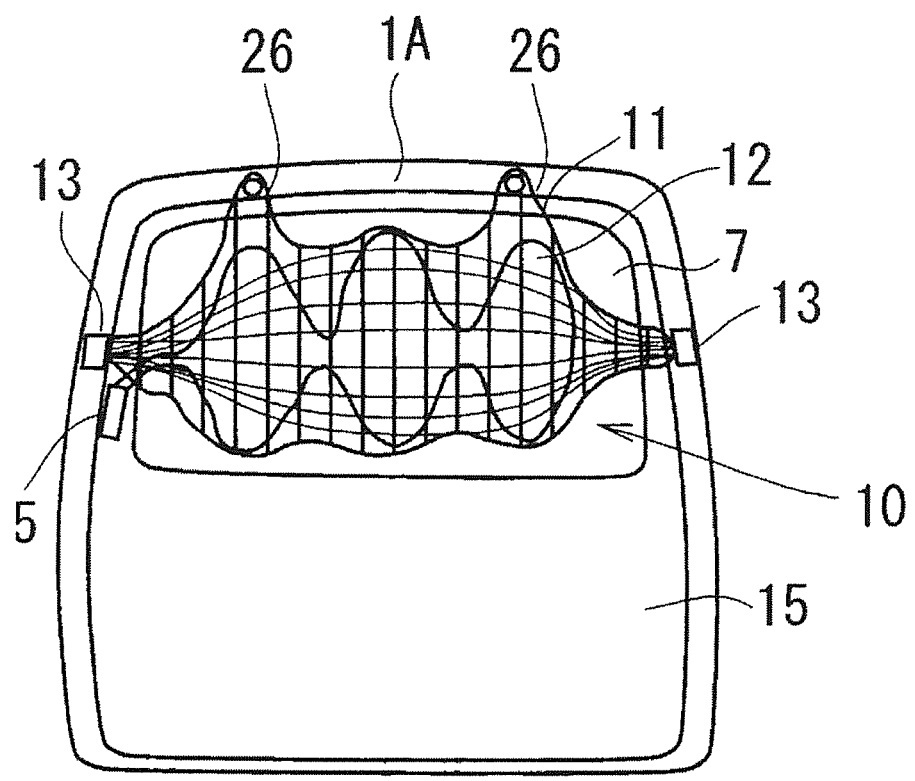
FIG. 10B illustrates an air bag device for rear-end collision that is equipped inside the roof at the rear end of a vehicle, and is a partial front view of another example of supporting the inflated air bag at a specified position.

The method for holding the inflated air bag 12 inside the sack-like body 11 at a specified position will be explained with reference to FIG. 10A to FIG. 11B. FIG. 10A and FIG. 10B illustrate the state wherein the expanded sack-like body 11 is suspended from the top end section of the vehicle body by a suspended member when the air bag 12 that is housed inside the air bag housing space 16 in the roof of the rear-end section of the vehicle is inflated.

In FIG. 10A, the air bag 12 is held in position by holding the expanded sack-like body 11 around the outside with a ring-shaped band 25, with one end 25a of that band 25 being fastened to a fastening section 1A on the vehicle. By holding the air bag 12 in position with this band 25, the air bag 12 can be held in the correct position even when inflated. Therefore, it is possible for the air bag 12 to more completely restrain the passenger even when the passenger moves backward at earlier timing than expected.

FIG. 10B illustrates an example wherein the rearmost seat is a 3-person seat, and the shape of the air bag 12 is such as to be able to protect the back of the head of each individual passenger. In the case of a sack-like body 11 as illustrated in FIG. 10B that is capable of housing an air bag 12 that is formed with a series of three inflated sections in a row, there is a possibility that sufficient contraction in the longitudinal direction cannot be obtained.

Therefore, in this example, in order that each inflated section of the air bag 12 is located at a suitable position for protecting the back of the head of a passenger, tabs 26 that are formed on the top section of the sack-like body 11 fasten to fastening sections 1A on the vehicle and hold the air bag 12 in position.

Figure 11A:
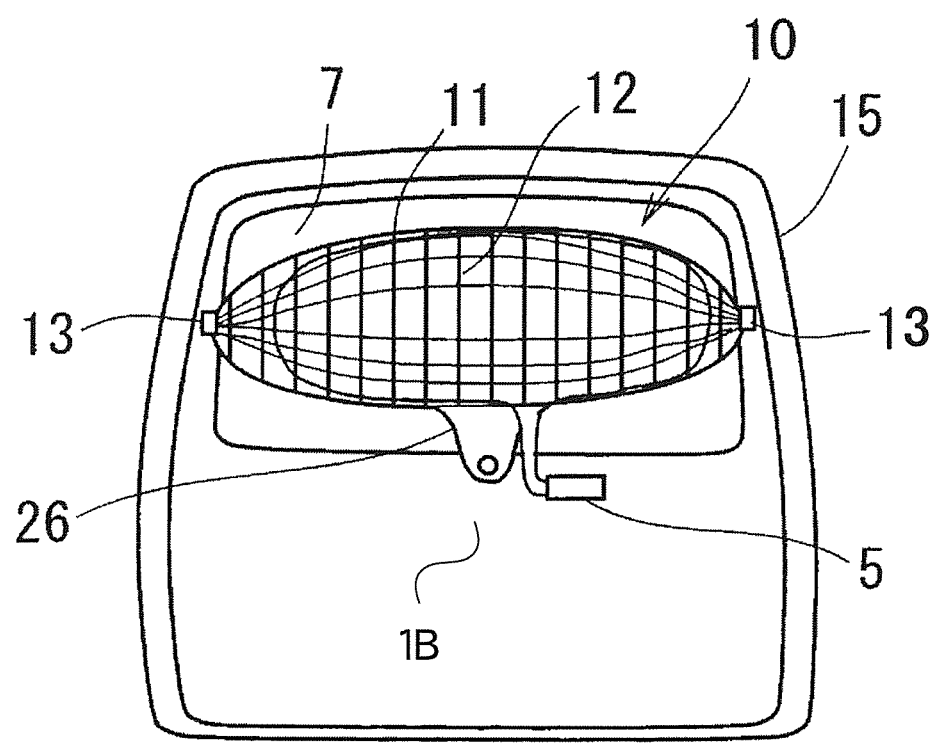
FIG. 11A illustrates an air bag device for rear-end collision that is equipped inside the rearmost door of a vehicle, and is a partial front view of an example of supporting the inflated air bag at a specified position.
Figure 11B:
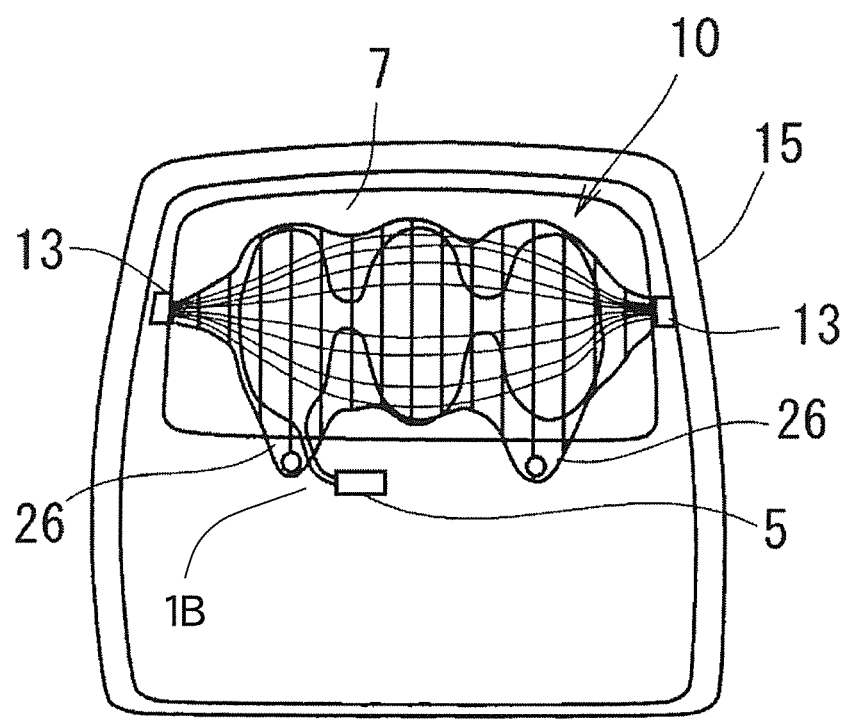
FIG. 11B illustrates an air bag device for rear-end collision that is equipped inside the rearmost door of a vehicle, and is a partial front view of another example of supporting the inflated air bag at a specified position.

FIG. 11A and FIG. 11B illustrate methods for holding the inflated air bag 12 that is housed inside the sack-like body 11 at a specified position in an air bag device 10 wherein an air bag housing section is provided on the rearmost door 15 side of a vehicle such as a hatch back door or the like. In the air bag 12 illustrated in FIG. 9A, the air bag 12 is pushed upward by the force of the gas that is supplied in the upward direction from the inflator 5, so there is a possibility that the sack-like body 11 will deform when it inflates such that it curves upward.

Therefore, in order to prevent that deformation, a tab 26 is formed on the bottom side of the sack-like body 11, and by fastening that tab 26 to a fastening section 1B near the rear window 7 of the vehicle, it is possible to prevent upward deformation of the air bag 12 that is housed inside the sack-like body 11. FIG. 11A illustrates an example wherein a method for preventing deformation of an air bag device 10 having a shape corresponding to that in FIG. 10A is provided, and FIG. 11B illustrates an example wherein a method for preventing deformation of an air bag device 10 having a shape corresponding to that in FIG. 10B is provided.

In the embodiments, the sack-like body 11 may be called mesh webbing, and the rearmost pillars 6 of the vehicle made by called the C pillars.

The present invention is not limited to the embodiments above, and can undergo various modifications within the range described in the claims. In other words, embodiments that are obtained by combining technical means that have been suitably changed within the range disclosed in the claims are also within the technical scope of the present invention.

The invention claimed is:
1. An air bag device for rear-end collision, comprising:
a rear-end collision detector that detects a rear-end collision of a vehicle;

an inflator that in response to detection of a collision by the rear-end collision detector, supplies gas to an air bag;

an air bag that is connected to the inflator, and inflates by gas that is supplied from the inflator;

a sack-like body that houses the air bag and that extends widthwise and shrinks longitudinally;

fastening sections that are provided on side frame of the vehicle, and that fasten the end sections in the longitudinal direction of the sack-like body; and a housing section that is provided at a top section or a bottom section of the vehicle along the side frame, and houses the sack-like body that is fastened to the fastening sections; wherein the sack-like body that is housed in the housing section extends widthwise and shrinks longitudinally as the air bag inflates, and maintains a tensed state and is positioned between the fastening sections.

2. The air bag device for rear-end collision according to claim 1, wherein the side frame is a pillar-like frame at the rearmost part of the vehicle.

3. The air bag device for rear-end collision according to claim 1, wherein the side frame is a door frame at the rearmost part of the vehicle.

4. The air bag device for rear-end collision according to claim 1, wherein the length in the width direction of the sack-like body extends, and the length in the longitudinal direction shrinks as the air bag inflates, such that the inflated sack-like body is regulated to a specified and inflated shape so as to be positioned along a straight line connecting between the fastening sections.

* * * * *